United States Patent
Zhang et al.

(10) Patent No.: US 8,279,881 B2
(45) Date of Patent: Oct. 2, 2012

(54) METHOD AND SYSTEM FOR ROUTE UPDATING

(75) Inventors: Renhai Zhang, Shenzhen (CN); Hui Ni, Shenzhen (CN); Yuan Rao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 316 days.

(21) Appl. No.: 11/969,657

(22) Filed: Jan. 4, 2008

(65) Prior Publication Data

US 2008/0101392 A1 May 1, 2008

Related U.S. Application Data

(63) Continuation of application No. PCT/CN2006/001040, filed on May 19, 2006.

(30) Foreign Application Priority Data

Jul. 6, 2005 (CN) .......................... 2005 1 0035653

(51) Int. Cl.
    *H04L 12/28* (2006.01)
(52) U.S. Cl. ......... 370/401; 370/400; 370/402; 370/404
(58) Field of Classification Search .................. 370/235, 370/254, 389, 395, 401, 428, 466
    See application file for complete search history.

(56) References Cited

U.S. PATENT DOCUMENTS

| 6,347,090 | B1 | 2/2002 | Ooms et al. | |
|---|---|---|---|---|
| 2002/0150041 | A1* | 10/2002 | Reinshmidt et al. | 370/216 |
| 2005/0207409 | A1* | 9/2005 | Naik et al. | 370/389 |
| 2006/0233181 | A1* | 10/2006 | Raszuk et al. | 370/401 |
| 2007/0047467 | A1* | 3/2007 | Enoki et al. | 370/254 |

FOREIGN PATENT DOCUMENTS

EP    1 063 814 A1    12/2000

OTHER PUBLICATIONS

Bates et al., Standards Track, 1-11 (Apr. 2000).
Xu et al., Telecommunication Science, 10: 15-18 (2004) www.cnki.net.

(Continued)

*Primary Examiner* — Hassan Phillips
*Assistant Examiner* — Anez Ebrahim
(74) *Attorney, Agent, or Firm* — Leydig, Voit & Mayer, Ltd.

(57) ABSTRACT

A method for route updating includes: a. determining more than one route in accordance with a predetermined preset mechanism and sending the determined more than one route to a client and/or a non-client, by a reflector in a route advertisement, and saving more than one route reaching the same destination address by the client and/or the non-client; and b. sending to the client and/or the non-client a message carrying information on the next hop of the route to be withdrawn, by the reflector in a withdrawal of a route and withdrawing the corresponding route for route updating in accordance with the information on the next hop carried in the message, by the client/the non-client. A system for route updating and a router reflector is also provided.

4 Claims, 3 Drawing Sheets

OTHER PUBLICATIONS

Internet Engineering Task Force, "A Border Gateway Protocol 4 (BGP-4)," Internet Standards Track Protocol (Mar. 1995).

Internet Engineering Task Force, "BGP Route Reflection—An Alternative to Full Mesh IBGP," Internet Standards Track Protocol (Apr. 2000).

Internet Engineering Task Force, "Capabilities Advertisement with BGP-4," Internet Standards Track Protocol (Nov. 2002).

Internet Engineering Task Force, "Entire Route Reflect capability," Internet Draft (draft-zhang-idr-bgp-entire-routes-reflect-02.txt) (Feb. 2006).

$2^{nd}$ Office Action in corresponding Chinese Application No. 200510035653.4 (Oct. 27, 2010).

Written Opinion of the International Searching Authority in corresponding PCT Application No. PCT/CN2006/001040 (Sep. 7, 2006).

* cited by examiner

METHOD AND SYSTEM FOR ROUTE UPDATING

CROSS-REFERENCE TO RELATED APPLICATIONS

The present application is a continuation application of International Application No. PCT/CN2006/001040, filed May 19, 2006, which claims priority to Chinese Patent Application No. 200510035653.4, filed Jul. 6, 2005.

FIELD OF THE INVENTION

The present invention relates to the filed of communication technology, and in particular to a method and system for route updating in an autonomous system.

BACKGROUND OF THE INVENTION

A large network such as Internet may be divided into multiple Autonomous Systems (ASs). Each autonomous system is considered as a self-managed network and is responsible only for managing routes in the autonomous system. For the Internet, route selection information in any two autonomous systems is not shared between each other.

The Border Gateway Protocol (BGP) is an inter-autonomous system dynamic route discovery protocol, and its basic function is to automatically exchange loop-free routing information between the autonomous systems. In contrast to protocols operating in autonomous systems, such as the Open Shortest Path First (OSFP) and the Routing Information Protocol (RIP), the BGP is an Edge Gateway Protocol (EGP). However, the OSPF and RIP are interior gateway protocols.

There are two types of BGP connections, i.e. the Internal BGP (IBGP) and the External BGP (EBGP). A BGP connection established in the same AS autonomous system is referred to as IBGP and a BGP connection established between different AS autonomous systems is referred to as EBGP.

Full-mesh connections are required for BGP peers operating in the same AS autonomous area because of constraints of functions and mechanisms of the protocol. In other words, an IBGP connection is required between any two routers operating BGP in the same AS. The IBGP connection is a TCP connection instead of a physical connection, and has relatively strict requirements with the complexity of a square of N. For example, in an autonomous system including N routers, N(N−1)/2 IBGP connections shall be established in the case of full-mesh connection. For this reason, a Router Reflector (RR) has been introduced in the autonomous system using the BGP protocol.

SUMMARY OF THE INVENTION

The invention is to provide a method and system for route updating so as to implement both load sharing and effective route updating in an autonomous system configured with a reflector.

A method for route updating includes:

a. determining more than one route in accordance with a preset mechanism and sending the determined route to a client/a non-client, by a reflector in a route advertisement, and saving more than one route reaching the same destination address by the client/the non-client; and b. sending to the client/the non-client a message carrying information on the next hop of the route to be withdrawn, by the reflector in a withdrawal of a route and withdrawing the corresponding route for route updating in accordance with the information on the next hop carried in the message, by the client/the non-client.

Preferably, before the step a, the method further includes: performing a multi-route processing capability advertisement negotiation for the same destination address during the establishment of a neighboring relationship between the reflector and the client/the non-client, and performing the step a on passing the negotiation.

Preferably, the preset mechanism is Transmission-of-All; and the process of determining more than one route in accordance with the preset mechanism includes: determining all received routes.

Preferably, the preset mechanism is Transmission-of-Optimal; and the process of determining more than one route in accordance with the preset mechanism includes: selecting optimal one of the routes based on each next hop and determining these optimal routes as the determined more than one route.

Preferably, the message is a route update message, and the route update message carries the information on the next hop of the route to be withdrawn.

Preferably, the information on the next hop of the route to be withdrawn is located in a preset Next Hop field if an address family is based on IPv4.

Preferably, the information on the next hop of the route to be withdrawn is located in the attribute field of MP_UN-REACH_NLRI for the route withdrawal and consists of Length of Next Hop Network Address and Network Address of Next Hop if an address family is based on non-IPv4.

A system for route updating, including a client, a non-client and a reflector operating the Border Gateway Protocol in an autonomous system, the reflector includes a route advertisement element and a route withdrawal element, and the client and the non-client each include a route saving element and a route update element, in which the route advertisement element in the reflector is adapted to determine more than one route in accordance with a preset mechanism and to send the determined route to the client and/or the non-client;

the route withdrawal element in the reflector is adapted to send to the client and/or the non-client a message carrying information on the next hop of a route to be withdrawn;

the route saving elements in the client and the non-client are each adapted to save the more than one route reaching the same destination address in accordance with a received route notification; and the route update elements in the client and the non-client are each adapted to withdraw the corresponding route for route updating in accordance with the information on the next hop carried in the received message.

Preferably, the reflector, the client and the non-client each further include:

a capability negotiation element, adapted to perform a multi-route processing capability advertisement negotiation for the same destination address during the establishment of a neighboring relationship via the Border Gateway Protocol.

Preferably, the message is a route update message and the route update message carries the information on the next hop of the route to be withdrawn.

Preferably, the information on the next hop of the route to be withdrawn is located in a preset Next Hop field if an address family is based on IPv4.

Preferably, the information on the next hop of the route to be withdrawn is located in the attribute field of MP_UN-REACH_NLRI for the route withdrawal and consists of Length of Next Hop Network Address and Network Address of Next Hop if an address family is based on non-IPv4.

The invention can achieve the following advantageous effects over the prior art.

According to the invention, during the route advertisement, the reflector sends more than one route to a client/non-client, instead of sending an optimal route as in the prior art to a client, in accordance with a predetermined mechanism, and the client/the non-client stores the multiple routes reaching the same destination address, so that load sharing of the respective routes can be implemented at the client/the non-client. Further, during the route withdrawal, the reflector sends to the client/the non-client a message carrying information on the next hop of the route to be withdrawn, and the client/the non-client withdraws the corresponding route for effective route updating in accordance with the information on the next hop carried in the message.

DETAILED DESCRIPTION OF THE INVENTION

Figure 1:
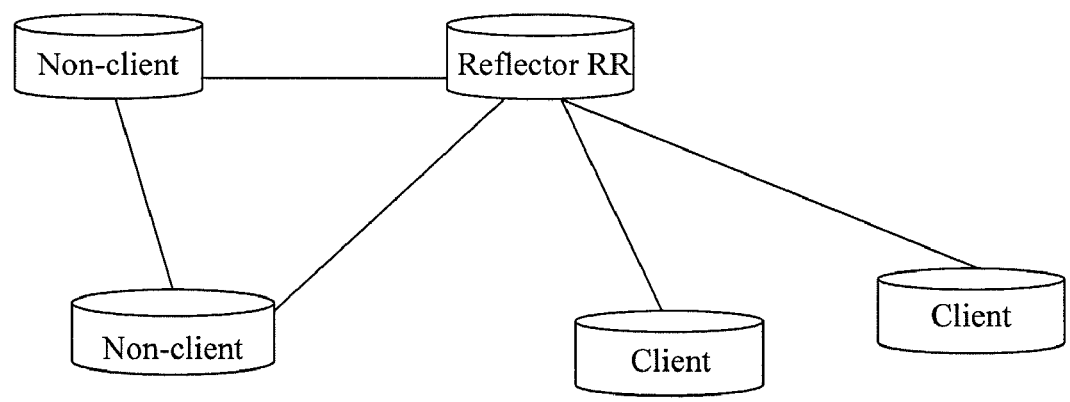
FIG. 1 is a schematic diagram of connections for establishing IBGP neighboring relationships between a reflector and clients as well as between the reflector and non-clients.

Referring to FIG. 1, in accordance with the concept of router reflector, the routers operating BGP in an autonomous system are divided into RR, client routers and non-client routers. The router reflector, the client router and the non-client router will be abbreviated as reflector, client and non-client respectively.

Referring to FIG. 1, as specified in the protocol for the reflector, full-mesh connections are maintained between the non-clients and the reflector in the autonomous system, and IBGP neighboring relationship should be established between the clients and the reflector. The route forwarding mechanism is that the reflector forwards routes received from a client to other clients and to the non-clients and forwards routes received from the non-clients to all the clients. Because of the avoidance of establishing a full-mesh connection neighboring relationship for all routers, the existence of the router effectively simplifies network configuration, reduces the cost of operation and maintenance, and the reflector has been widely used in the backbone network of the operator.

Further, at the access end two paths are typically established between the reflector and the backbone network for network robustness, to access the different routers in the backbone network, so that a redundant backup can be provided. On the premise that the network maintains stable, traffic travel over both links is desired in order to implement load sharing. For example, referring to FIG. 2, AS65535 and AS100 are two user autonomous systems respectively, and AS100 is a backbone network. The user router RTA at the Customer Edge (CE) end accesses the backbone network AS100 of the operator via PE1 and PE2. For reducing the number of BGP neighbors, a router in the backbone network is configured as a reflector. PE1, PE2 and PE3 each are a client of the reflector, and no configuration of the BGP neighboring relationship is required between the clients, e.g. between PE1 and PE3, and between PE2 and PE3.

If an advertised route in the BGP protocol is reachable, information on the next hop of the route is provided. However, the message of Withdrawn in the protocol carries no information on the next hop of the route, the RR router therefore when receiving user-end routes respectively from PE1 and PE2 selects and sends an optimal one of the routes to PE3 in accordance with the BGP route selection rule. Therefore, the traffic sent from PE3 to the user autonomous system AS65535 travels only along PE3-PE1-RTA or PE3-PE2-RTA, and which specific path to be selected is dependent on the RR route selection rule, so that load sharing can not be achieved. If full-mesh connection is adopted instead of the configuration of a reflector, PE3 may receive client routes sent respectively from PE1 and PE2. In this case, because PE3 has obtained two paths, the traffic can travel concurrently along PE3-PE1-RTA and PE3-PE2-RTA in accordance with the load sharing rule. However, it would be very difficult to configure BGP full-mesh connections in the complicated backbone network.

Figure 2:
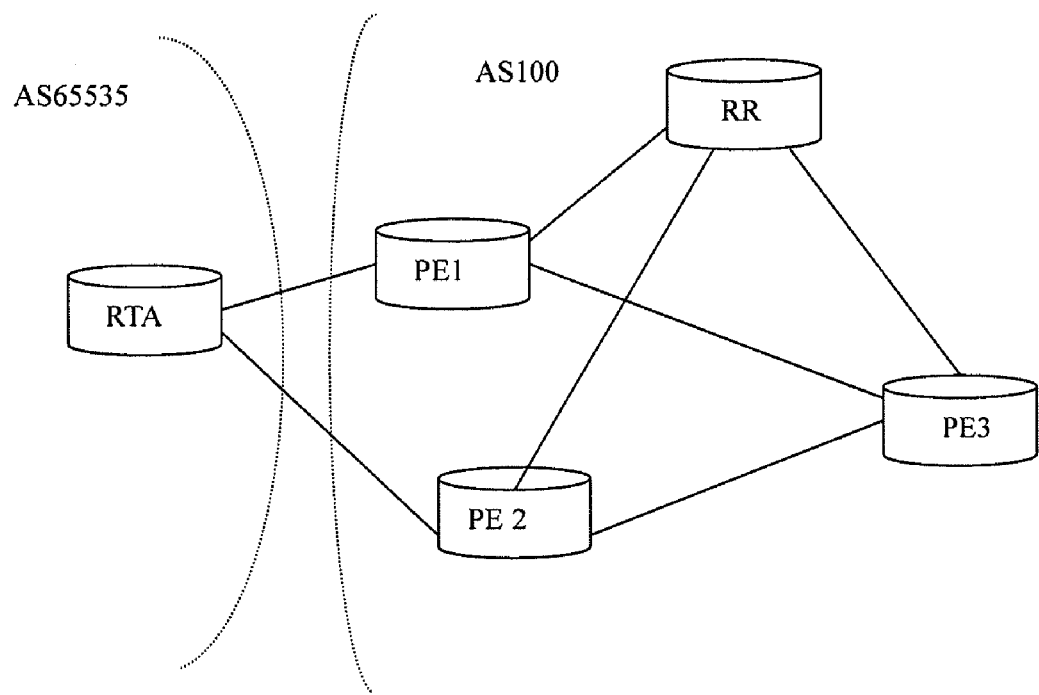
FIG. 2 is a schematic diagram of connections of physical links in an autonomous system configured with a reflector.

FIG. 2 illustrates by an example the above problem between the clients and the reflector. The same problem also exists between non-clients and the reflector due to the RR route selection rule.

The idea of the invention lies in that in a route advertisement a reflector sends more than one route instead of an optimal route to a client/non-client in accordance with a predetermined mechanism, and load sharing can be therefore implemented at the client/non-client; and in a withdrawal of routing information, a route to be withdrawn is specified definitely to ensure accurate updating of the route.

A system to which the invention is applied mainly involves a reflector, clients and non-clients using the BGP protocol. The reflector shall reflect all routes from the clients/non-clients, which shall be reflected, in order to implement load sharing in the backbone network configured with the reflector. Referring to the example as illustrated in FIG. 2, this figure embodies a typical networking scenario. A user accesses the backbone network of an operator respectively via PE1 and PE2. The reflector RR may receive user-end routing information respectively from PE1 and PE2. There are two routes at the reflector RR, which reach the same user address, i.e. they reach the user address from PE1 and PE2 respectively. If the reflector RR sends both of the routes to PE3, PE3 will also know that the user-end address can be reachable respectively from PE1 and PE2, so that load sharing can be implemented for the traffic passing through PE3 and reaching at a user autonomous system. Further, since the reflector has forwarded multiple routes reaching the same destination address to the client, it shall specify in a withdrawn route message the next hop of a route to be withdrawn so as to specify definitely the route to be withdrawn. For the withdrawal of a route in an IPv4 address family, the information content of the next hop is a 4-byte IP address, which is located between the Withdrawn Routes Length and the Withdrawn Routes in a route update message. The length identified by Withdrawn Routes Length includes the length of the next hop field, and a specific format is as follow:

Withdrawn Routes Length (2 octets)
NEXT_HOP (4 octets)
Withdrawn Routes (variable)

For another route in a non-IPv4 address family, the information on the next hop consists of Length of Next Hop Network Address and Network Address of Next Hop. The Length of Next Hop Network Address specifies the length of address in the address family. The Network Address of Next Hop specifies the address of the next hop in the address family. The information is located in the attribute field of MP_UNREACH_NLRI for route withdrawal and a specific format is as follows:

> Address Family Identifier (2 octets)
> Subsequent Address Family Identifier (1 octet)
> Length of Next Hop Network Address (1 octet)
> Network Address of Next Hop (variable)
> Withdrawn Routes (variable)

Figure 3:
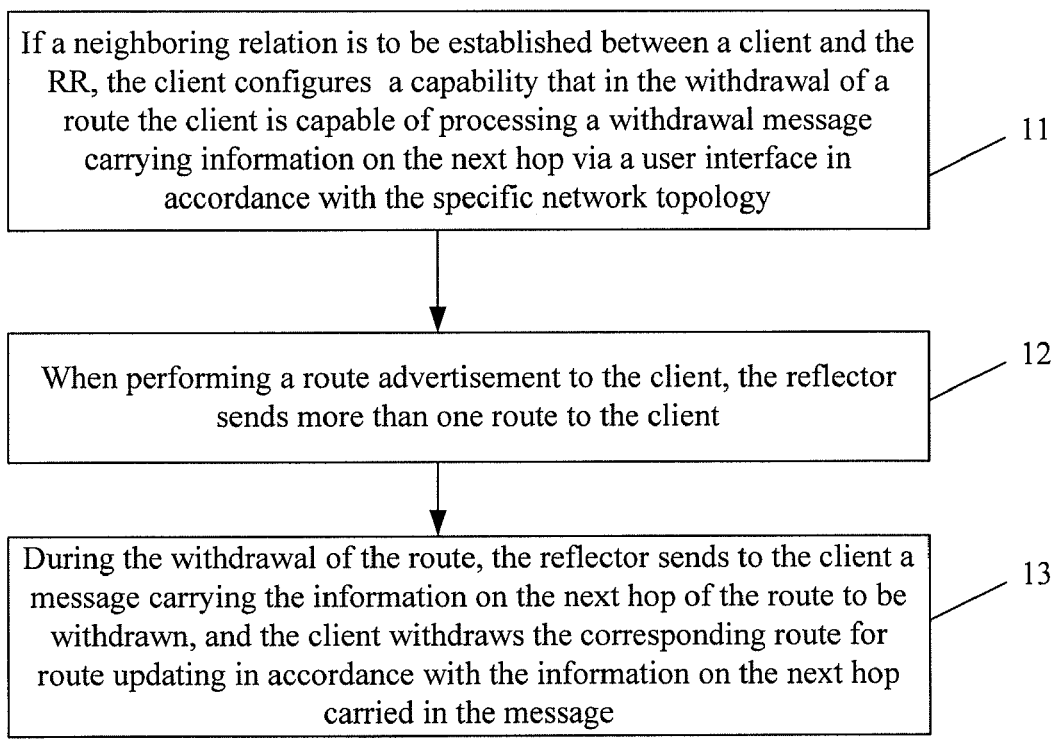
FIG. 3 is a flow chart of a route updating method according to an embodiment of the invention.

FIG. 3 is a flow chart of a route updating method according to an embodiment of the invention.

In this embodiment, an advertisement of multi-route processing capability for the same destination address is added through a BGP capability negotiation mechanism. In other words, in a route advertisement, the reflector can send multiple routes to the client, and the client is capable of saving the multiple routes reaching the same destination address; and in a route withdrawal, the reflector can forward a withdrawal message notification carrying information on the next hop. In a specific implementation, in step 11, when the neighboring relationship is established between a client and the RR, the client and the RR negotiate about the above capabilities and are configured respectively in accordance with the specific network topology and networking requirements, so as to be capable of processing a message carrying information on the next hop. An existing capability negotiation procedure may be adopted during the specific negotiation. For the invention, corresponding capabilities parameters (Optional Capabilities Parameters) are added in the Open message from the client during the capability negotiation, and the content of the added parameters are as follows:

| AFI | Res. | SAFI |
|---|---|---|

Where:
AFI: Address Family Identifier (16 bits), the coding of which is the same as the BGP multi-protocol extension.
Res.: Reserved field (8 bits).
SAFI: Sub-Address Family Information (8 bits), the coding of which is the same as the BGP multi-protocol extension.

Different capabilities can be negotiated about for multiple different address families in accordance with the above carried parameters. The above capabilities can be provided for the respective address families if the negotiation is passed.

In step 12, after both parties negotiate about the capabilities with success, in a route advertisement to the client, the reflector sends more than one route instead of only one optimal route to the client in accordance with a predetermined mechanism. The client saves the multiple routes reaching the same destination address.

The above predetermined mechanism may be implemented variously as required in practice. For example, if the predetermined mechanism is Transmission-of-All, all routes are sent to the client, i.e. the reflector performs no route selection and instead sends all the routes to the client; and if the predetermined mechanism is Transmission-of-optional, the reflector selects the optimal one of the routes on the basis of each next hop and sends these optimal routes to the client. Indeed, other implementations can be also possible and will not be limited to these.

In step 13, during the route withdrawal, the reflector sends to the client a message carrying information on the next hop of the route to be withdrawn, and the client withdraws the corresponding route for route updating in accordance with the information on the next hop carried in the message. In a specific implementation, the message in the invention refers to a route update message of Update. The method of the route update message of Update carrying the information on the next hop during the route withdrawal is described as above, and is not repeated here.

The above embodiment has described the interaction between the reflector and a client by an example. When the reflector advertises routes to a non-client or instructs a non-client to withdraw a route, the specific implementation is the same as that for a client except that the client is replaced by the non-client. The implementation is not repeated here.

The invention also provides a route updating system. The system includes an autonomous system consisting of a client, a non-client and a reflector operating the Border Gateway Protocol. The reflector includes a route advertisement element and a route withdrawal element. The client and the non-client each include a route saving element and a route update element.

The route advertisement element in the reflector is adapted to determine more than one route in accordance with a predetermined mechanism and to send the determined route to the client and/or the non-client.

The route withdrawal element in the reflector is adapted to send to the client and/or the non-client a message carrying information on the next hop of a route to be withdrawn. The message is a route update message, i.e. the route update message carries the information on the next hop of the route to be withdrawn.

The route saving elements in the client and the non-client are each adapted to save the more than one route reaching the same destination address in accordance with a received route notification.

The route update elements in the client and the non-client are each adapted to withdraw the corresponding route for route updating in accordance with the information on the next hop carried in the received message.

Further, the reflector, the client and the non-client each further include a capability negotiation element adapted to perform a multi-route processing capability advertisement negotiation for the same destination address during the establishment of a neighboring relationship via the Border Gateway Protocol.

If the address family is based on IPv4, the information on the next hop of the route to be withdrawn is located in a preset Next Hop field.

If the address family is based on non-IPv4, the information on the next hop of the route to be withdrawn is located in the attribute field of MP_UNREACH_NLRI for the route withdrawal and consists of Length of Next Hop Network Address and Network Address of Next Hop.

In summary, the invention solves effectively the problem that load sharing can not be implemented in a backbone network configured with a reflector. Further, a new Optional Capability advertisement is introduced to identify such a processing capability of a router, and the standard Optional Capability negotiation process in the BGP protocol is used for the seamless backward compatibility with existing devices.

The above are merely preferred embodiments of the invention and do not limit the scope of the invention. Any modification, equivalent substitutions and adaptations made to the invention within the spirit and principle of the invention shall fall into the scope of the claims appended to the invention.

What is claimed is:

1. A method for route updating in an Autonomous System (AS), comprising:

selecting more than one route by selecting an optimal one of the routes for each of multiple next hops, determining the selected optimal routes as a determined more than one route in accordance with a predetermined mechanism, sending the determined more than one route to one of a BGP client and a non-client within the AS, by a reflector in a route advertisement, and saving the determined more than one route reaching the same destination address by one of the BGP client and the non-client; and sending, by the reflector, a message including information regarding which route should be withdrawn indicated by the next hop of the route, to one of the BGP client and the non-client, and withdrawing, by one of the BGP client and the non-client, the corresponding route for route updating in accordance with the message;

wherein the message is a route update message, the route update message carrying information on the next hop of the route to be withdrawn;

if an address family is based on IPv4, the information on the next hop of the route to be withdrawn is located in a preset Next HOP field; and if an address family is based on non-IPv4, the information on the next hop of the route to be withdrawn is located in the attribute field of MP UNREACH NLRI for the route withdrawal and consists of Length of Next HOP Network Address and Network Address of Next HOP.

2. The method according to claim 1, wherein before the step a, the method further comprises: performing a multi-route processing capability advertisement negotiation for the same destination address during the establishment of a neighboring relationship between the reflector and the client or the non-client.

3. A system for route updating, comprising a BGP client, a non-client and a reflector operating the Border Gateway Protocol in an autonomous system, wherein the reflector comprises a route advertisement element and a route withdrawal element, and each of the BGP client and the non-client comprises a route saving element and a route update element, wherein:

the route advertisement element in the reflector is configured to select more than one route by selecting an optimal one of the routes for each of multiple next hops and determine the selected optimal routes as a determined more than one route in accordance with a predetermined mechanism and to send the determined more than one route to one of the BGP client and the non-client;

the route withdrawal element in the reflector is configured to send to one of the BGP client and the non-client a message including information regarding which route should be withdrawn indicated by the next hop of the route;

the route saving elements in the BGP client and the non-client are each configured to save the determined more than one route reaching the same destination address in accordance with a received route notification; and the route update elements in the BGP client and the non-client are each configured to withdraw the route for route updating in accordance with the information in the received message;

wherein the message is a route update message, the route update message carrying information on the next hop of the route to be withdrawn;

if an address family is based on IPv4, the information on the next hop of the route to be withdrawn is located in a preset Next HOP field; and if an address family is based on non-IPv4, the information on the next hop of the route to be withdrawn is located in the attribute field of MP UNREACH NLRI for the route withdrawal and consists of Length of Next HOP Network Address and Network Address of Next HOP.

4. The system according to claim 3, wherein the reflector, the client and the non-client each further comprise:

a capability negotiation element, configured to perform a multi-route processing capability advertisement negotiation for the same destination address during the establishment of a neighboring relationship via the Border Gateway Protocol.

* * * * *